UNITED STATES PATENT OFFICE.

ALFONSE KAUFMAN, OF NEW YORK, N. Y., ASSIGNOR, BY MESNE ASSIGNMENTS, TO AIR REDUCTION COMPANY, INCORPORATED, A CORPORATION OF NEW YORK.

PROCESS OF MAKING SODIUM CYANID.

1,339,706. Specification of Letters Patent. Patented May 11, 1920.

No Drawing. Application filed May 2, 1917. Serial No. 165,858.

*To all whom it may concern:*

Be it known that I, ALFONSE KAUFMAN, a citizen of the United States, residing at New York, in the county of New York and State of New York, have invented certain new and useful Improvements in Processes of Making Sodium Cyanid, of which the following is a full, clear, and exact description, such as will enable others skilled in the art to which it appertains to make and use the same.

This invention relates to improvements in process for the production of alkali metal cyanids, and more particularly to improvements in the process of treating sodium carbonate for the production of sodium cyanid, as described in the copending application of Charles B. Jacobs, filed August 19, 1916, Serial No. 115,758.

By the process of the Jacobs application referred to an alkali metal compound, such as sodium carbonate in pulverized form, is intimately mixed with a carbonaceous mass, such as pulverized coking coal, and the mixture heated initially sufficient to expel the volatile elements in the coal. A porous composition containing coke, carbonate of sodium and oxid of sodium results from the heating treatment indicated. Thereafter, either in the same or another retort, free or elementary nitrogen under pressure is injected through the mass and the heating temperature raised to approximately 1000° C., or more, whereupon chemical reaction takes place and the sodium carbonate is converted into its cyanid, in accordance with the formula—

$$Na_2CO_3 + 4C + 2N = 2NaCN + 3CO$$

A suitable apparatus for carrying out the chemical reaction described may comprise a furnace having an interior vertical retort or fixation chamber, preferably tubular, which is charged through the top with the sodium carbonate and other material. At the conclusion of the treatment the resultant product is designed to be removed by gravity through an opening in the lower end of the retort.

For economical manufacture on a commercial scale, it is necessary that removal of the reaction products from the fixation chamber be easy and rapid. It has been found, however, when carbon in the form of coking coal or coke is alone, or to too great a percentage, employed for mixture with the sodium carbonate in preparing the latter for nitrogen and heat treatment, that the reaction product may tend to fuse at high temperatures and in cooling form a solidified mass, or that parts of the charge may stick to the walls of the retort and thereby render removal slow and difficult. In order to insure against the contingency mentioned, and to render the charge after treatment capable of certain and expeditious removal, while leaving the fixation chamber thoroughly cleared for succeeding charges, I provide a certain proportion of charcoal in the initial mixture with sodium carbonate. In practice it is found that the charcoal, when present as from approximately 5 per cent. to 20 per cent. of the charge, acts to facilitate the reaction and especially to leave the product in a finely divided condition without liability of melting or causing particles to fuse and stick to the walls of the retort. The removal of the support for the mass therefore practically allows the charge to drop out freely.

Since, as will be apparent, it is important for the economic working of the entire process of cyanid production, that the removal of the charge should take place easily, it is thus very advantageous to employ carbon in a form having the physical and mechanical characteristics, such as porosity and absorptive capacity, of charcoal, as a stated portion of the carbonized element in preparing the alkali metal compound for treatment to obtain its cyanid.

The term "mineral carbon" is used in the appended claims to designate coking coal, coke and equivalents thereof in the process described.

Having described my invention, what I claim as new and desire to secure by Letters Patent is:—

1. The process of preparing an alkali metal compound for chemical reaction under heat with carbon and nitrogen, which consists in intimately mixing the compound in a finely divided state with a carbon mass, including a relatively low proportion of carbonized material having the high porosity and absorptive capacity characteristics of charcoal sufficient to prevent such fusing of the reaction product under the heat employed as would tend to solidify the mass on cooling.

2. The process of preparing an alkali metal compound for chemical reaction under heat with carbon and nitrogen, which consists in intimately mixing the compound in a finely divided state with mineral carbon and a proportion varying from 5 per cent. to 20 per cent. of finely divided charcoal, for the purpose described.

3. The process of preparing an alkali metal compound for chemical treatment under heat to obtain its cyanid, which consists in mixing the powdered compound with coking coal and with at least 5 per cent. of charcoal, for the purpose described.

4. The process of preparing sodium carbonate for treatment under heat with carbon and nitrogen to obtain sodium cyanid, which consists in intimately mixing powdered sodium carbonate with powdered mineral carbon and a proportion varying from 10 per cent. to 20 per cent. of charcoal.

In testimony whereof I affix my signature, in the presence of two witnesses.

ALFONSE KAUFMAN.

Witnesses:
  J. L. Pueve,
  Fred D. Reid.